(12) United States Patent
Wang et al.

(10) Patent No.: US 9,572,125 B1
(45) Date of Patent: Feb. 14, 2017

(54) SYSTEMS AND METHODS FOR LOCATING UNRECOGNIZED COMPUTING DEVICES

(71) Applicant: Symantec Corporation, Mountain View, CA (US)

(72) Inventors: Qiyan Wang, Santa Clara, CA (US); Anand Kashyap, Pune (IN)

(73) Assignee: Symantec Corporation, Mountain View, CA (US)

( * ) Notice: Subject to any disclaimer, the term of this patent is extended or adjusted under 35 U.S.C. 154(b) by 3 days.

(21) Appl. No.: 14/475,581

(22) Filed: Sep. 3, 2014

(51) Int. Cl.
*G06F 7/04* (2006.01)
*H04W 64/00* (2009.01)
*H04W 12/06* (2009.01)

(52) U.S. Cl.
CPC ............ *H04W 64/00* (2013.01); *H04W 12/06* (2013.01)

(58) Field of Classification Search
CPC .................................................. H04W 64/00
USPC .............................................................. 726/3
See application file for complete search history.

(56) References Cited

U.S. PATENT DOCUMENTS

| | | | | |
|---|---|---|---|---|
| 2005/0030929 | A1* | 2/2005 | Swier, Jr. ................ | H04L 63/10 370/338 |
| 2005/0080924 | A1* | 4/2005 | Shang .................. | G06K 9/6251 709/239 |
| 2007/0087763 | A1* | 4/2007 | Budampati .......... | H04W 12/06 455/456.5 |
| 2007/0247367 | A1* | 10/2007 | Anjum ................. | H04W 64/00 342/464 |
| 2011/0188389 | A1* | 8/2011 | Hedley ................. | G01S 5/0215 370/252 |
| 2012/0149415 | A1* | 6/2012 | Valaee ................. | H04W 64/00 455/507 |

(Continued)

OTHER PUBLICATIONS

Dalai, AK & Jena, SK , Intruder Identification in IEEE 802.11 wireless Infrastructure using Localization, 6*th* International Conference on Future Networks (ICFN, 2014), Jun. 14-15, 2014, Hong KOng, pp. 1-5.*

(Continued)

*Primary Examiner* — Luu Pham
*Assistant Examiner* — Canh Le
(74) *Attorney, Agent, or Firm* — FisherBroyles LLP

(57) ABSTRACT

The disclosed computer-implemented method for locating unrecognized computing devices may include (1) identifying a plurality of cooperating computing devices on a wireless network that are each configured with a device location application, (2) determining a physical location for each cooperating computing device within the plurality of cooperating computing devices, (3) receiving, from the device location application on the plurality of cooperating computing devices, data about packets intercepted by the plurality of cooperating computing devices that are directed to the wireless network by an unrecognized computing device, and (4) locating the unrecognized computing device based on information received from the plurality of cooperating computing devices that identifies both the physical location for each cooperating computing device and signal strengths of the packets intercepted by the plurality of cooperating computing devices. Various other methods, systems, and computer-readable media are also disclosed.

20 Claims, 7 Drawing Sheets

(56) References Cited

U.S. PATENT DOCUMENTS

| | | | |
|---|---|---|---|
| 2013/0045750 A1* | 2/2013 | Kim | G01S 5/14 |
| | | | 455/456.1 |
| 2013/0170378 A1* | 7/2013 | Ray | G01S 5/0289 |
| | | | 370/252 |
| 2014/0120931 A1* | 5/2014 | Shin | H04W 64/00 |
| | | | 455/452.1 |
| 2015/0087239 A1* | 3/2015 | Yang | H04W 64/00 |
| | | | 455/67.11 |
| 2015/0133150 A1* | 5/2015 | Shin | H04W 4/02 |
| | | | 455/456.1 |
| 2015/0237471 A1* | 8/2015 | Li | H04W 4/021 |
| | | | 455/456.2 |

OTHER PUBLICATIONS

Mariano Garcia-Otero et al., "Secure Geographic Routing in Ad Hoc and Wireless Sensor Networks," Jul. 2010, pp. 1-12.*
Ashutosh Kuntal et al.,Optimization technique based localization in IEEE 802.11 WLAN, 2014 IEEE, pp. 1-5.*
Chiyan Wang, et al.; Context-aware intruder detection using WiFi MAC addresses; U.S. Appl. No. 14/222,447, filed Mar. 21, 2014.

\* cited by examiner

SYSTEMS AND METHODS FOR LOCATING UNRECOGNIZED COMPUTING DEVICES

BACKGROUND

Most discussions on computing security revolve around purely digital threats such as viruses, Trojans, and other malware. But computing devices can also be used to increase physical security against intruders in the home and in offices. For example, many people today carry mobile devices with them wherever they go and many of those mobile devices are constantly searching for wireless networks. This may also be true for unwelcome intruders, who may not remove or turn off their mobile devices before trespassing. In some cases, a person who is authorized to be in one area of a building may be considered an intruder in another area. Locating an unrecognized mobile device may allow security systems to locate the user of the device.

Many traditional systems for locating computing devices require cooperation from the device itself, often in the form of a location application. However, potentially malicious intruders and their mobile devices cannot be counted upon to include such location applications and/or broadcast their own location to security systems. While some traditional systems may be able to locate uncooperative devices by triangulating the device's location based on data from wireless access points, such systems may require additional software on the access points to accomplish this triangulation. Accordingly, the instant disclosure identifies and addresses a need for additional and improved systems and methods for locating unrecognized computing devices.

SUMMARY

As will be described in greater detail below, the instant disclosure describes various systems and methods for triangulating the location of unrecognized computing devices using data on packet signal strength collected by cooperating computing devices with known locations. In one example, a computer-implemented method for performing such a task may include (1) identifying cooperating computing devices on a wireless network that are each configured with a device location application, (2) determining a physical location for each cooperating computing device, (3) receiving, from the device location application on the cooperating computing devices, data about packets intercepted by the cooperating computing devices that are directed to the wireless network by an unrecognized computing device, and (4) locating the unrecognized computing device based on information received from the cooperating computing devices that identifies both the physical location for each cooperating computing device and the signal strengths of the packets intercepted by the cooperating computing devices.

In one embodiment, identifying the cooperating computing devices may include determining that each of the cooperating computing devices is registered on a list of recognized computing devices. In this embodiment, receiving the data about packets directed to the wireless network by the unrecognized computing device may include determining that the unrecognized computing device is not registered on the list of recognized computing devices. In some examples, determining that the unrecognized computing device is not registered on the list of recognized computing devices may include identifying, by analyzing the packets sent by the unrecognized computing device, a unique identifier of the unrecognized computing device. In some examples, a list of recognized computing devices may be generated by identifying all of the computing devices that are configured with the device location application. In these examples, the unrecognized computing device may not be registered on the list due to not being configured with the device location application.

In some examples, the computer-implemented method may further include determining that the packets intercepted by the cooperating computing devices were sent by the same unrecognized computing device by determining, by comparing an identifier within the packets, that the packets include the same identifier and/or determining, by comparing a timestamp of the packets, that the packets include the same timestamp. In one embodiment, the packets sent by the unrecognized computing device may include wireless network probe packets sent to seek a wireless access point.

In one example, the computer-implemented method may further include receiving, from the device location application on a single cooperating computing device, additional data about additional packets intercepted by the single cooperating computing device that are directed to the wireless network by an additional unrecognized computing device. In this example, the computer-implemented method may also include determining a distance of the additional unrecognized computing device from the single cooperating computing device based on information received from the single cooperating computing device that identifies both the physical location for the single cooperating computing device and the signal strength of the additional packets intercepted by the single cooperating computing device.

In some examples, determining the physical location for each cooperating computing device may include, for each cooperating device, using the device location application to determine the physical location based on the distances of the cooperating computing device from each of a set of wireless access points for the wireless network. In one embodiment, the device location application may not be installed on the unrecognized computing device.

In one embodiment, the computer-implemented method may further include (1) alerting a user to a location of the unrecognized computing device, (2) storing a location of the unrecognized computing device to a log of computing device locations, and/or (3) storing an event caused by the unrecognized computing device to a log of events. In some examples, the computer-implemented method may further include detecting abnormal behavior by an owner of the unrecognized computing device by tracking at least one location of the unrecognized computing device over a period of time.

In one embodiment, a system for implementing the above-described method may include (1) an identification module, stored in memory, that identifies cooperating computing devices on a wireless network that are each configured with a device location application, (2) a determination module, stored in memory, that determines a physical location for each cooperating computing device, (3) a receiving module, stored in memory, that receives, from the device location application on the cooperating computing devices, data about packets intercepted by the cooperating computing devices that are directed to the wireless network by an unrecognized computing device, (4) a location module, stored in memory, that locates the unrecognized computing device based on information received from the cooperating computing devices that identifies both the physical location for each cooperating computing device and the signal strengths of the packets intercepted by the cooperating computing devices, and (5) at least one physical processor configured to execute the identification module, the determination module, the receiving module, and the location module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify cooperating computing devices on a wireless network that are each configured with a device location application, (2) determine a physical location for each cooperating computing device, (3) receive, from the device location application on the cooperating computing devices, data about packets intercepted by the cooperating computing devices that are directed to the wireless network by an unrecognized computing device, and (4) locate the unrecognized computing device based on information received from the cooperating computing devices that identifies both the physical location for each cooperating computing device and the signal strengths of the packets intercepted by the cooperating computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
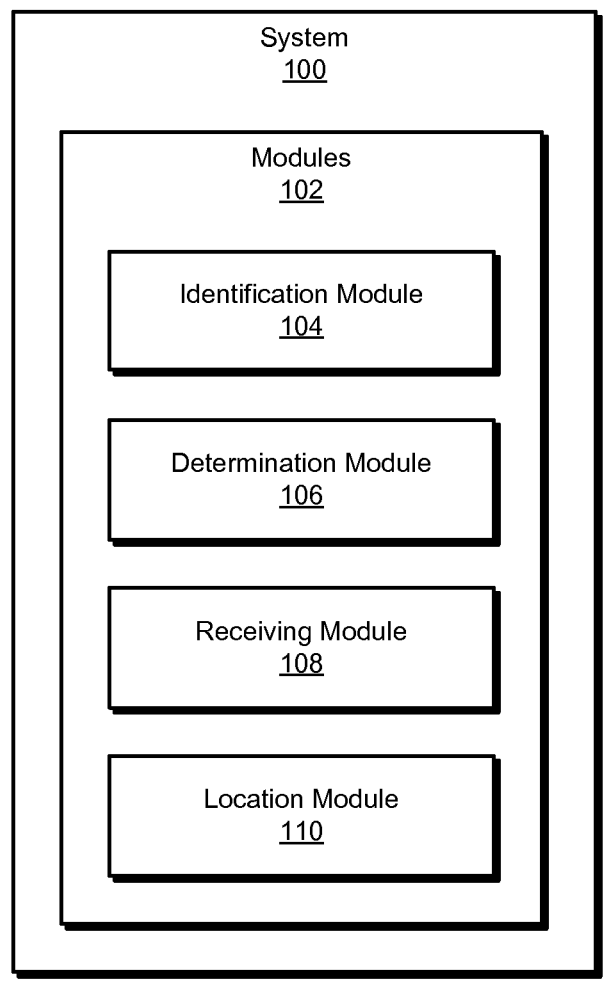
FIG. 1 is a block diagram of an exemplary system for locating unrecognized computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for locating unrecognized computing devices.

As will be explained in greater detail below, by using cooperating devices configured with a device location application to intercept wireless probe packets from unrecognized computing devices, the systems described herein may determine the location of unrecognized computing devices without requiring the installation of location software on either the unrecognized computing devices or the wireless access points to which the devices may be trying to connect.

Figure 2:
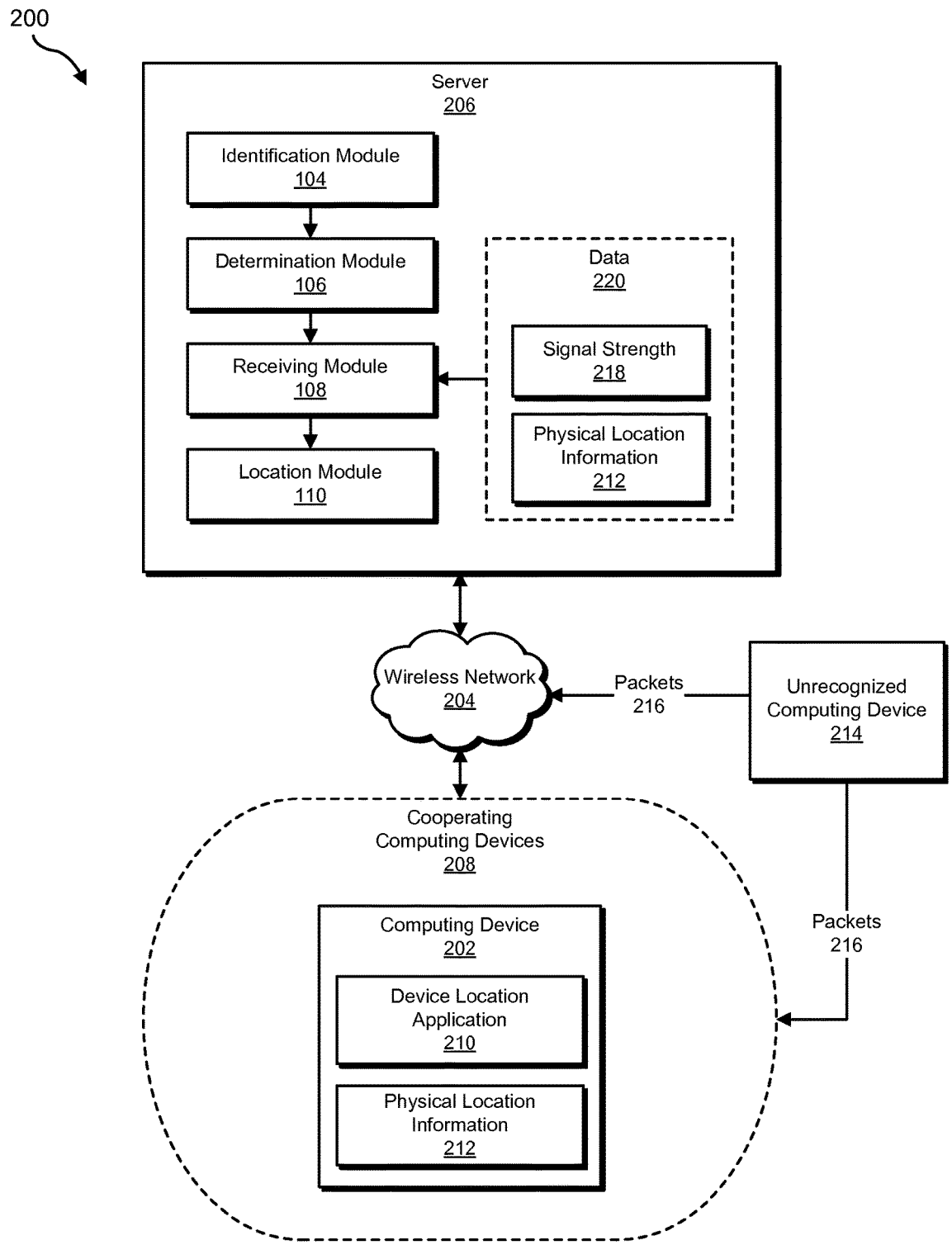
FIG. 2 is a block diagram of an additional exemplary system for locating unrecognized computing devices.

The following will provide, with reference to FIGS. 1-2, detailed descriptions of exemplary systems for locating unrecognized computing devices. Detailed descriptions of corresponding computer-implemented methods will also be provided in connection with FIG. 3. Detailed descriptions of floor plan diagrams will also be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for locating unrecognized computing devices. As illustrated in this figure, exemplary system 100 may include one or more modules 102 for performing one or more tasks. For example, and as will be explained in greater detail below, exemplary system 100 may include an identification module 104 that may identify a set of cooperating computing devices on a wireless network that are each configured with a device location application. Exemplary system 100 may additionally include a determination module 106 that may determine a physical location for each cooperating computing device within the set of cooperating computing devices. Exemplary system 100 may also include a receiving module 108 that may receive, from the device location application on the set of cooperating computing devices, data about packets intercepted by the set of cooperating computing devices that are directed to the wireless network by an unrecognized computing device. Exemplary system 100 may additionally include a location module 110 that may locate the unrecognized computing device based on information received from the set of cooperating computing devices that identifies both the physical location for each cooperating computing device and the signal strengths of the packets intercepted by the set of cooperating computing devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a wireless network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to locate unrecognized computing devices. For example, and as will be described in greater detail below, identification module 104 may identify a set of cooperating computing devices 208 on a wireless network 204 that are each configured with a device location application 210. Next, determination module 106 may determine the physical location of each cooperating computing device 202 within the set of cooperating computing devices 208. At some later time, receiving module 108 may receive, from device location application 210 on cooperating computing devices 208, data 220 about packets 216 intercepted by cooperating computing devices 208 that are directed to wireless network 204 by an unrecognized computing device 214. After receiving data 220, location module 110 may locate unrecognized computing device 214 based on information received from cooperating computing devices 208 (e.g., data 220) that identifies both the physical location of each cooperating computing device 202 and the signal strength 218 of packets 216 intercepted by cooperating computing devices 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of analyzing packet information. Examples of server 206 include, without limitation, application servers and database servers configured to provide various database services and/or run certain software applications.

Wireless network 204 generally represents any medium or architecture capable of facilitating communication or data transfer. Examples of wireless network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Wireless network 204 may facilitate communication or data transfer using wireless or wired connections. In one embodiment, wireless network 204 may facilitate communication between computing device 202 and server 206.

Figure 3:
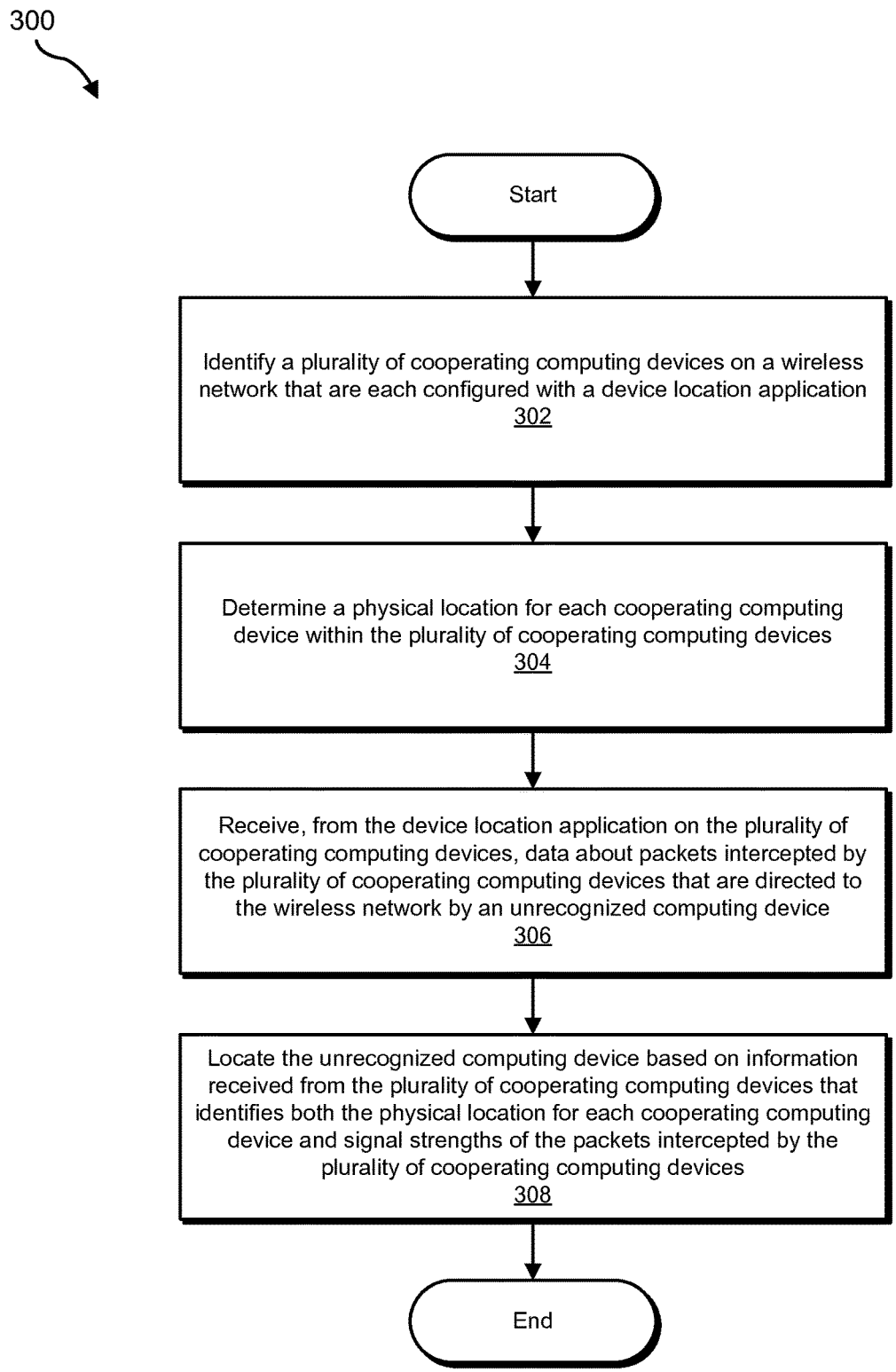
FIG. 3 is a flow diagram of an exemplary method for locating unrecognized computing devices.

FIG. 3 is a flow diagram of an exemplary computer-implemented method 300 for locating unrecognized computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a set of cooperating computing devices on a wireless network that are each configured with a device location application. For example, identification module 104 may, as part of server 206 in FIG. 2, identify cooperating computing devices 208 on wireless network 204 that are each configured with a device location application 210.

The term "device location application," as used herein, generally refers to any application installed on a computing device that may gather and/or transmit information about the location of the computing device and/or information that may lead to calculating the location of other computing devices. In some embodiments, this device location application may collect information about intercepted packets and/or may include a proxy module that may send information about intercepted packets to a remote analysis server, as explained in greater detail below.

The term "cooperating computing device," as used herein, generally refers to any computing device that may collaborate to locate other computing devices. In some examples, cooperating computing devices may be owned and/or managed by an enterprise that may configure the devices with a variety of applications, such as a device location application. In one example, cooperating computing devices may all be provisioned from the same image that includes a device location application.

Identification module 104 may identify the cooperating computing devices in a variety of ways and/or contexts. For example, identification module 104 may include and/or have access to a list of computing devices (such as the devices within an enterprise) that are configured with a device location application. In another example, identification module 104 may receive messages from device location applications on the computing devices that inform identification module 104 of the configuration status and/or location of the computing devices.

At step 304, one or more of the systems described herein may determine a physical location for each cooperating computing device within the set of cooperating computing devices. For example, determination module 106 may, as part of server 206 in FIG. 2, determine the physical locations of cooperating computing devices 208.

The term "physical location," as used herein, generally refers to any information describing the location of an object in physical space. Examples of physical locations may include, without limitation, a street address, a set of global positioning system (GPS) coordinates, a floor in a building, a room in a building, an aisle number, a zone identifier, a location in a custom coordinate system, and/or a distance from a defined point.

Determination module 106 may determine the physical location of each cooperating computing device in a variety of ways. In one example, determination module 106 may determine the physical location of a cooperating computing device based on information received from another service (such as a device location application, GPS service, etc. on the device itself) that has already determined the physical location of the cooperating computing device. For example, determination module 106 may determine the location of computing device 202 based on physical location information 212, received from device location application 210 installed on computing device 202, that identifies the physical location of computing device 202.

Figure 4:
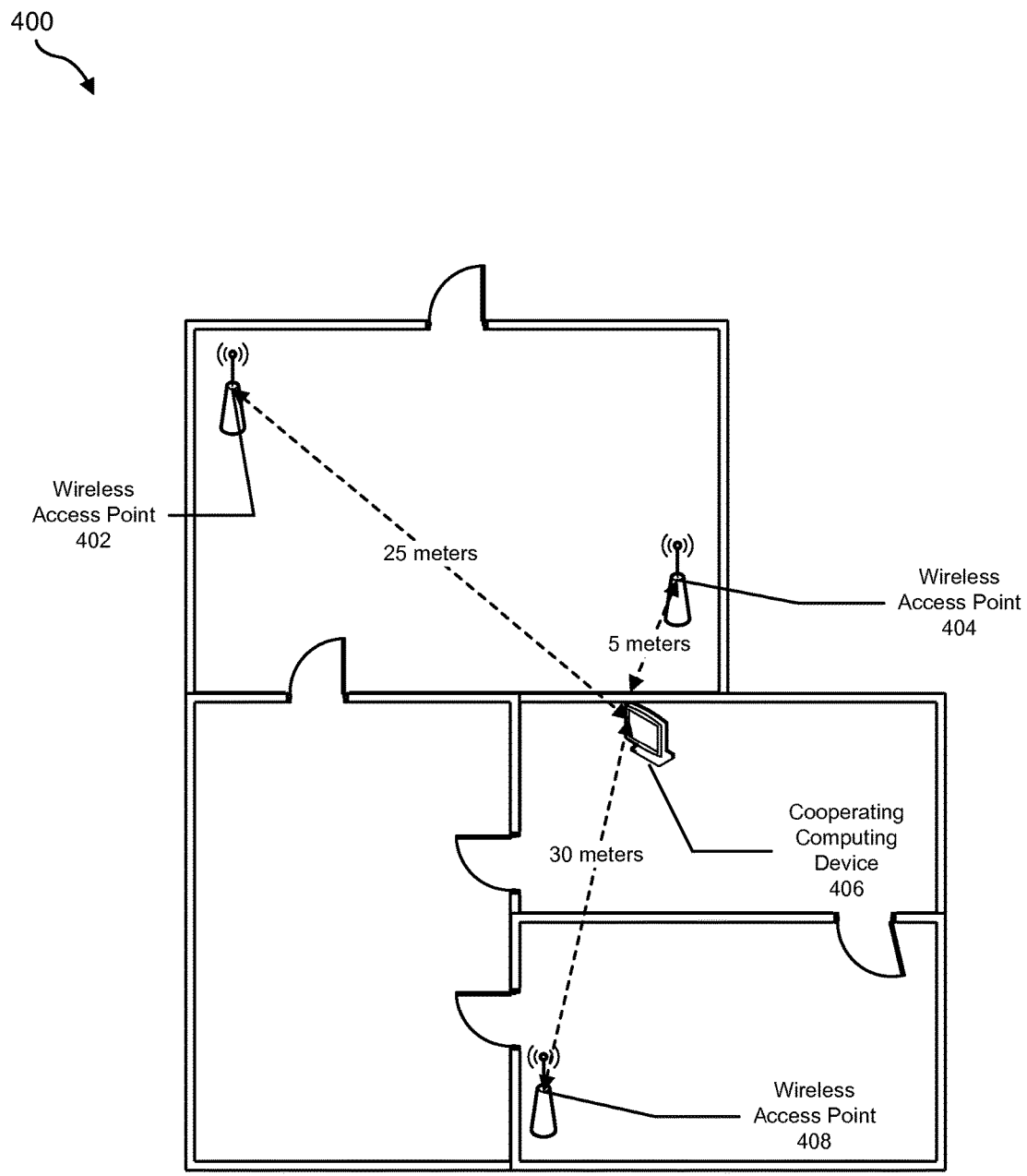
FIG. 4 is a floor plan diagram of an exemplary computing system for locating cooperating computing devices.

Device location application 210 may determine the physical location of a computing device in a variety of ways. In some embodiments, device location application 210 may determine the physical location of a computing device based on the distance of the computing device from each of a group of wireless access points within a wireless network. For example, and as illustrated in FIG. 4, cooperating computing device 406 may be within range of wireless access points 402, 404, and/or 408. In this example, device location application 210 may use the signal strengths received from these wireless access points to determine that wireless access point 402 is 25 meters away, wireless access point 404 is 5 meters away, and/or wireless access point 408 is 30 meters away. In this case, device location application 210 may be aware of the fixed locations of the wireless access points and may thus determine its own location by triangulating based on both those fixed locations and the calculated distances from each wireless access point. Device location application 210 may be aware of the locations of these wireless access points for a variety of reasons, including due to receiving that information from a server and/or having a list of wireless access point locations manually inputted by a user.

Upon determining the physical location of cooperating computing device 406, device location application 210 may transmit information that identifies this physical location (e.g., physical location information 212) to determination module 106 on server 206. In some examples, device location application 210 may continuously transmit physical location information 212 to determination module 106. Additionally or alternatively, device location application 210 may transmit physical location information 212 to determination module 106 at specified intervals, when unrecognized computing device 214 is detected, and/or in response to a request from determination module 106.

Returning to FIG. 3, at step 306, one or more of the systems described herein may receive, from the device location application on the set of cooperating computing devices, data about packets intercepted by the set of cooperating computing devices that are directed to the wireless network by an unrecognized computing device. For example, receiving module 108 may, as part of server 206 in FIG. 2, receive, from device location application 210 on cooperating computing devices 208, data 220 about packets 216 intercepted by cooperating computing devices 208 that are directed to wireless network 204 by unrecognized computing device 214.

The term "packets," as used herein, generally refers to any transmission that may be sent by a computing device. The term "packets" may refer to multiple independent packets and/or to different iterations of the same packet as received by different devices. In some examples, packets may be sent over a wireless network. For example, packets may include wireless network probe packets sent by a computing device to seek a wireless access point.

The term "unrecognized computing device," as used herein, may refer to any computing device that is not on a list of recognized computing devices, not authorized to be in a certain area, and/or not configured in a specified way. For example, an unrecognized computing device may be a personal mobile device that is not on a list of enterprise devices that are permitted to be used in an office building. In another example, an unrecognized computing device may be an enterprise mobile device that is not permitted to be in a lab where only specific enterprise devices are recognized as authorized. In addition, an unrecognized computing device may be any computing device that is not configured with a particular application, such as a data loss prevention application and/or a device location application.

Receiving module 108 may receive packet data in a variety of ways and/or contexts. For example, receiving module 108 may be part of a backend server that analyzes and/or records location information for unrecognized devices. Receiving module 108 may also be part of a remote server in a cloud-computing environment. In some embodiments, receiving module 108 may receive the packet data from the cooperating computing devices exactly as it was captured by the cooperating computing devices. In other embodiments, the cooperating computing devices may process and/or analyze the packet data in some way before forwarding the packet data to receiving module 108.

As detailed above, in one embodiment identification module 104 may identify the cooperating computing devices by determining that each of the cooperating computing devices is registered on a list of recognized computing devices. In this embodiment, receiving module 108 may determine, upon receiving data about the packets that are directed to the wireless network by the unrecognized computing device, that the unrecognized computing device is not registered on the list of recognized computing devices. For example, and as explained above, a server responsible for calculating and/or tracking device location information may maintain a list of registered computing devices, such as a list of all known devices within an organization or enterprise. In this example, the list of registered computing devices may include a list of identifiers associated with the computing devices and/or a list of users associated with the computing devices. For example, an administrator may maintain a list of registered computing devices and the permissions of the users of those devices.

In some examples, the systems described herein may determine that the unrecognized computing device is not registered on the list of recognized computing devices based on an analysis of the packets sent by the unrecognized computing device. For example, receiving module 108 on server 206 may receive data 220 that includes information about packets 216. In this example, packets 216 may include a unique identifier of unrecognized computing device 214. Receiving module 108 may then determine, by comparing the unique identifier in packets 216 with a list of unique identifiers for the computing devices in cooperating computing devices 208, that the unique identifier for unrecognized computing device 214 is not found in the list. In one example, a unique identifier may include a media access control (MAC) address.

In some embodiments, the systems described herein may determine, by comparing an identifier within the packets, that the packets include the same identifier and/or determine, by comparing a timestamp of the packets, that the packets include the same timestamp. For example, the systems described herein may compare the MAC address of the computing device from which the packets originated in order to determine that the packets originated from the same computing device. In another example, the systems described herein may compare the timestamps of packets intercepted by different cooperating computing devices in order to determine that the packets are instances of the same packet sent by the same computing device. For example, several cooperating computing devices may receive packets that each include a certain MAC address and the timestamp 1406330036. In this example, the systems described herein may use either or both of the above methods to determine that the packets were sent by the same unrecognized computing device. In some embodiments, a remote server may analyze the packets to determine that they were sent by the same unrecognized computing device.

At step 308, one or more of the systems described herein may locate the unrecognized computing device based on information received from the set of cooperating computing devices that identifies both the physical location for each cooperating computing device and the signal strengths of the packets intercepted by the set of cooperating computing devices. For example, location module 110 may, as part of server 206 in FIG. 2, locate unrecognized computing device 214 based on information received from cooperating computing devices 208 (e.g., data 220) that identifies both the physical location of each cooperating computing device 202 and the signal strengths of packets 216 intercepted by cooperating computing devices 208.

Figure 5:
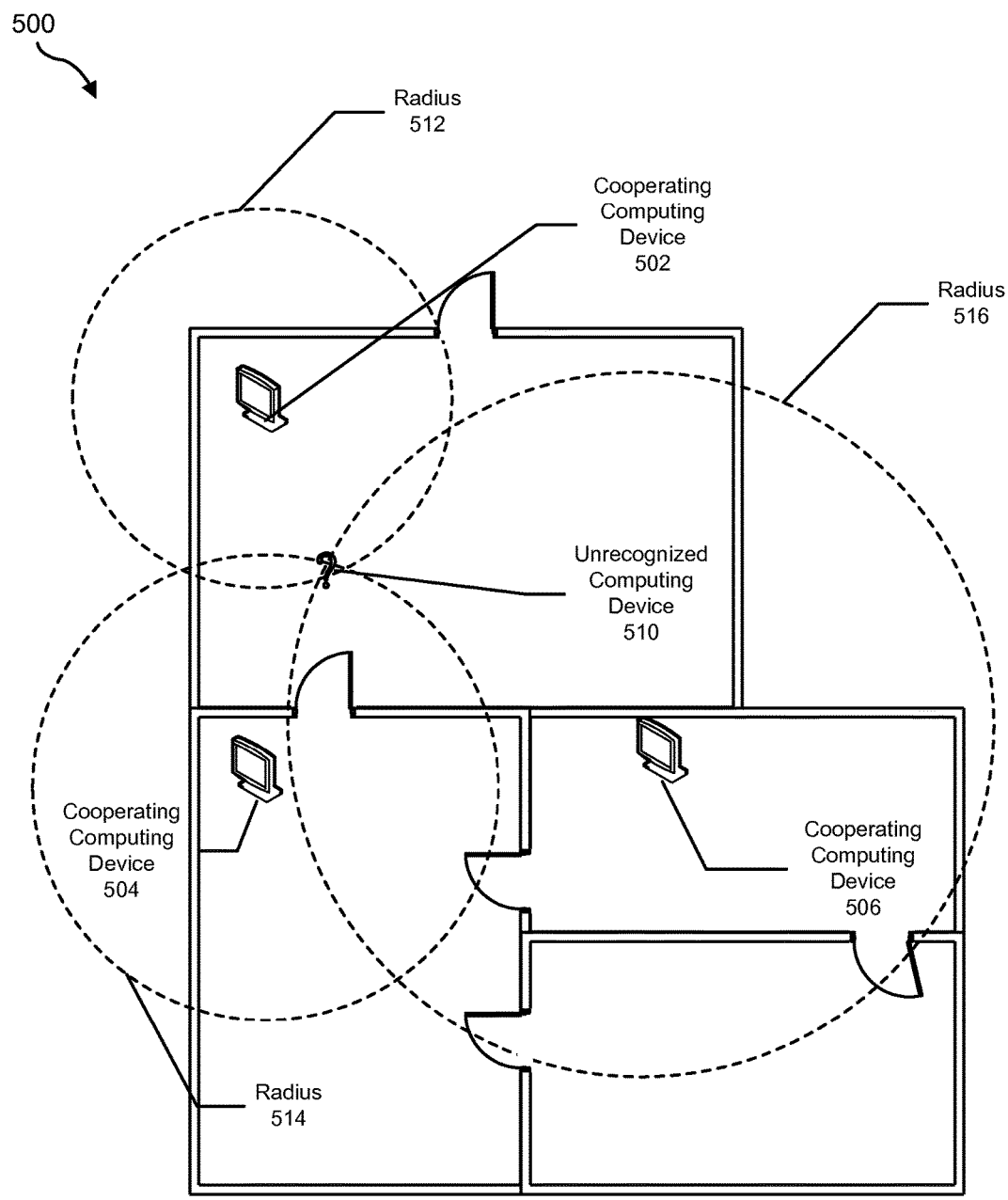
FIG. 5 is a floor plan diagram of an exemplary computing system for locating unrecognized computing devices.

Location module 110 may locate the unrecognized computing device in a variety of ways and/or contexts. In one example, location module 110 may locate the unrecognized computing device by triangulating based on the signal strengths of the packets intercepted by cooperating computing devices at known locations. For example, and as illustrated in FIG. 5, cooperating computing device 502 may receive packets with a signal strength that indicates that unrecognized computing device 510 is somewhere along radius 512. Cooperating computing device 504 may also receive packets with a signal strength that indicates that unrecognized computing device 510 is somewhere along radius 514. Additionally, cooperating computing device 506 may receive packets with a signal strength that indicates that unrecognized computing device 510 is somewhere along radius 516. In this example, the systems described herein may determine that the intersection of radii 512, 514, and 516 may be the location of unrecognized computing device 510.

In some embodiments, location module 110 may determine the location of the unrecognized computing device based exclusively on information received from the cooperating computing devices. For example, by triangulating the location of unrecognized computing device 214 based exclusively on data 220 received from cooperating computing devices 208, as explained above, location module 110 may determine the location of unrecognized computing device 214 without receiving information from any additional sources, such as wireless access points and/or the unrecognized computing device itself. As such, the disclosed systems may avoid the difficulty of relying on unrecognized computing devices that are configured with certain applications and/or that voluntarily disclose certain information. Determining the location of unrecognized computing devices based exclusively on information received from cooperating computing devices may also avoid the additional work of configuring wireless access points with applications to track unrecognized devices.

In some examples, receiving module 108 may receive, from the device location application on a single cooperating computing device, additional data about additional packets intercepted by the single cooperating computing device that are directed to the wireless network by an additional unrecognized computing device. In this example, location module 110 may determine a distance of the additional unrecognized computing device from the single cooperating computing device based on information received from the single cooperating computing device that identifies both the physical location for the single cooperating computing device and the signal strength of the additional packets intercepted by the single cooperating computing device. For example, as illustrated in FIG. 5, cooperating computing device 506 may intercept packets from unrecognized computing device 510 indicating that unrecognized computing device 510 may be located somewhere along radius 516. In this example, the size of radius 516 indicates the distance of unrecognized computing device 510 from cooperating computing device 506. However, because cooperating computing device 506 may be the only cooperating computing device within range of unrecognized computing device 510, the systems described herein may not be able to make further determinations about the exact location of unrecognized computing device 510.

Once the systems described herein have located an unrecognized computing device, these systems may take any or all of a variety of security actions. For example, the systems described herein may (1) alert a user to a location of the unrecognized computing device, (2) store a location of the unrecognized computing device to a log of computing device locations, and/or (3) store an event caused by the unrecognized computing device to a log of events. In one embodiment, the systems described herein may alert administrators and/or security personnel to the presence and/or location of an unrecognized computing device in areas not accessible to the public.

In one embodiment, the systems described herein may detect abnormal behavior by an owner of the unrecognized computing device by tracking at least one location of the unrecognized computing device over a period of time. For example, a security policy may allow personal mobile devices in certain areas of a building but may restrict them from others. In this example, an owner of a personal mobile device who normally stays in unrestricted areas may wander into restricted areas. The systems described herein may track this movement and determine that the mobile device is not registered to a list of recognized computing devices allowed in restricted areas. In another example, a visitor may be allowed in public areas but not in a lab, or an engineer may be allowed in labs and conference rooms but not in executive offices. In either case, the systems described herein may, by tracking personal mobile devices owned by visitors and/or engineers, determine when a security policy is being breached. In response to detecting this breach, the systems described herein may alert an administrator and/or security personnel that a user that has breached the security policy. Additionally or alternatively, the systems described herein may log the security policy violations for later prosecution.

As explained in connection with method 300 above, the systems described herein may monitor the location of unrecognized computing devices by installing location determination applications on centrally managed computing devices distributed to cooperating users, such as employees. In this example, the cooperating computing devices may run traditional triangulation algorithms to locate themselves based on the known locations of wireless access points. The cooperating computing devices may then passively listen for wireless probe packets and send any packets sent by a device with an unknown MAC address to a remote server that may calculate the location of the unrecognized device, log events, perform analysis on the path of the device, and/or take other security actions. By locating unrecognized devices in this manner, the systems described herein may allow administrators to better enforce company policies, such as prohibiting devices with cameras from being used in certain areas, tracking device users who may only be permitted in certain parts of a building, and/or identifying potentially malicious intruders who may not be allowed on the premises.

Figure 6:
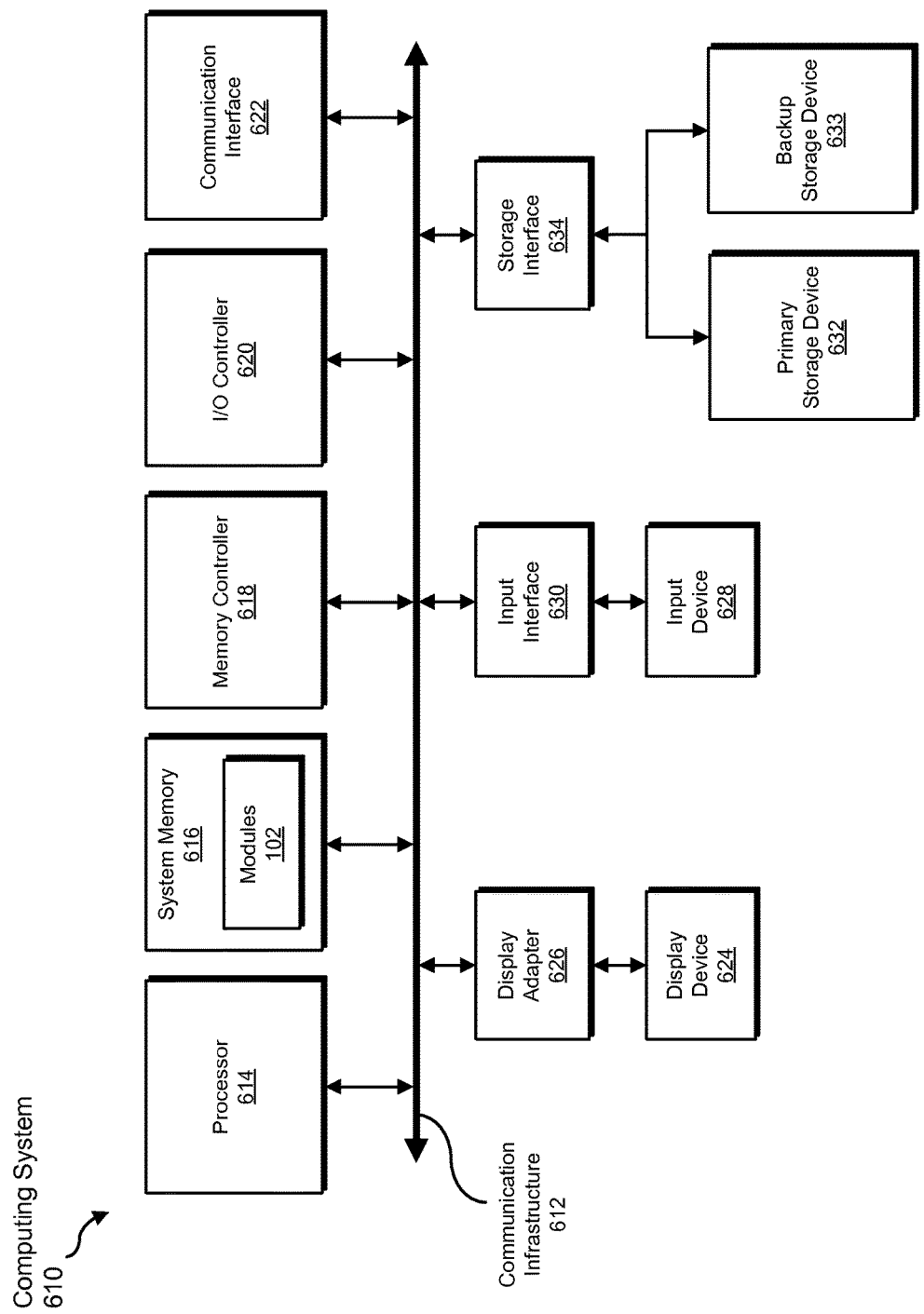
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
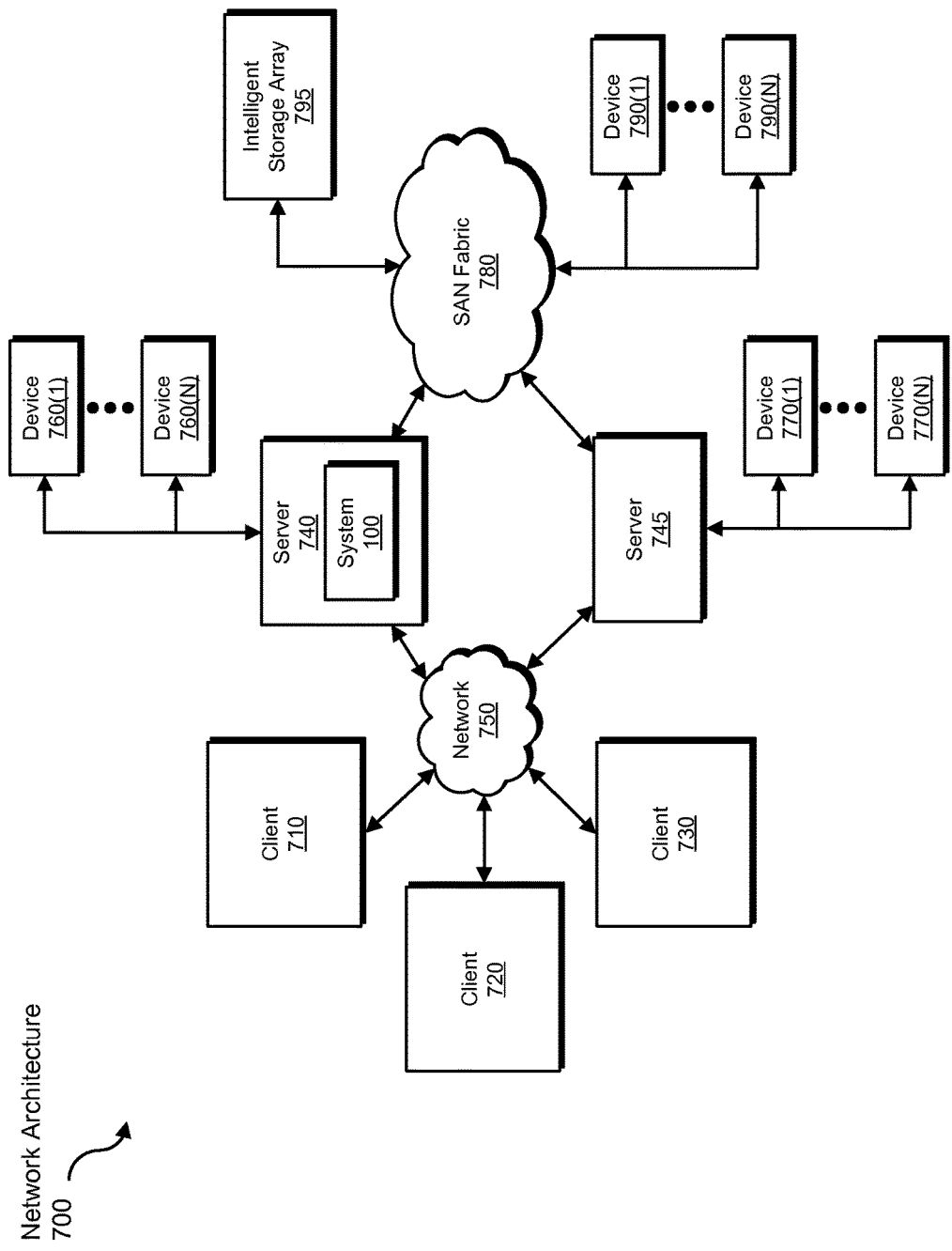
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for locating unrecognized computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive packet data to be transformed, transform the packet data, output a result of the transformation to a triangulation algorithm, use the result of the transformation to determine a location, and store the result of the transformation to a log file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for locating unrecognized computing devices, at least a portion of the method being performed by a computing device comprising at least one processor, the method comprising:
    identifying a plurality of cooperating computing devices on a wireless network that are each configured with a device location application, wherein none of the cooperating computing devices comprise a wireless access point;
    determining, at least in part by the device location application on the plurality of cooperating computing devices, a physical location for each cooperating computing device within the plurality of cooperating computing devices;
    receiving, from the device location application on the plurality of cooperating computing devices, data about packets intercepted by the plurality of cooperating computing devices that are directed to the wireless network by an unrecognized computing device that is not registered on a list of recognized computing devices;
    determining that the packets intercepted by the plurality of cooperating computing devices were sent by the same unrecognized computing device at least in part by determining, by comparing a timestamp of the packets, that the packets comprise the same timestamp;
    locating the unrecognized computing device based exclusively on information received from the plurality of cooperating computing devices and without receiving information from any wireless access points or the unrecognized computing device, wherein the information identifies both the physical location for each cooperating computing device and signal strengths of the packets intercepted by the plurality of cooperating computing devices; and
    performing a security action in response to detecting, by tracking the location of the unrecognized computing device over a period of time, abnormal behavior by the unrecognized computing device, wherein the security action comprises at least alerting an administrator of the wireless network that the unrecognized computing device has performed the abnormal behavior.

2. The computer-implemented method of claim 1, wherein:
    identifying the plurality of cooperating computing devices comprises determining that each of the plurality of cooperating computing devices is registered on a list of recognized computing devices; and
    receiving the data about packets intercepted by the plurality of cooperating computing devices that are directed to the wireless network by the unrecognized computing device comprises determining that the unrecognized computing device is not registered on the list of recognized computing devices.

3. The computer-implemented method of claim 2, wherein determining that the unrecognized computing device is not registered on the list of recognized computing devices comprises identifying, by analyzing the packets sent by the unrecognized computing device, a unique identifier of the unrecognized computing device.

4. The computer-implemented method of claim 1, wherein the device location application is not installed on the unrecognized computing device.

5. The computer-implemented method of claim 1, wherein the packets sent by the unrecognized computing device comprise wireless network probe packets sent to seek a wireless access point.

6. The computer-implemented method of claim 1, wherein determining that the packets intercepted by the plurality of cooperating computing devices were sent by the same unrecognized computing device further comprises determining, by comparing an identifier within the packets, that the packets comprise the same identifier that uniquely identifies the unrecognized computing device.

7. The computer-implemented method of claim 1, further comprising:
    receiving, from the device location application on a single cooperating computing device within the plurality of cooperating computing devices, additional data about additional packets intercepted by the single cooperating computing device that are directed to the wireless network by an additional unrecognized computing device; and
    determining a distance of the additional unrecognized computing device from the single cooperating computing device based on information received from the single cooperating computing device that identifies both the physical location for the single cooperating computing device and a signal strength of the additional packets intercepted by the single cooperating computing device.

8. The computer-implemented method of claim 1, wherein determining the physical location for each cooperating computing device comprises, for each cooperating computing device, using the device location application to determine the physical location based on distances of the cooperating computing device from each of a plurality of wireless access points for the wireless network.

9. The computer-implemented method of claim 1, further comprising at least one of:
   alerting a user to a location of the unrecognized computing device;
   storing a location of the unrecognized computing device to a log of computing device locations; and
   storing an event caused by the unrecognized computing device to a log of events.

10. A system for locating unrecognized computing devices, the system comprising:
   a memory;
   an identification module, stored in the memory, that identifies a plurality of cooperating computing devices on a wireless network that are each configured with a device location application, wherein none of the cooperating computing devices comprise a wireless access point;
   a determination module, stored in the memory, that determines, at least in part by the device location application on the plurality of computing devices, a physical location for each cooperating computing device within the plurality of cooperating computing devices;
   a receiving module, stored in the memory, that:
   receives, from the device location application on the plurality of cooperating computing devices, data about packets intercepted by the plurality of cooperating computing devices that are directed to the wireless network by an unrecognized computing device that is not registered on a list of unrecognized computing devices; and
   determines that the packets intercepted by the plurality of cooperating computing devices were sent by the same unrecognized computing device by determining, by comparing a timestamp of the packets, that the packets comprise the same timestamp; and
   a location module, stored in the memory, that:
   locates the unrecognized computing device based exclusively on information received from the plurality of cooperating computing devices, wherein the information identifies both the physical location for each cooperating computing device and signal strengths of the packets intercepted by the plurality of cooperating computing devices; and
   performs a security action in response to detecting, by tracking the location of the unrecognized computing device over a period of time, abnormal behavior by the unrecognized computing device, wherein the security action comprises at least alerting an administrator of the wireless network that the unrecognized computing device has performed the abnormal behavior; and
   at least one physical processor configured to execute the identification module, the determination module, the receiving module, and the location module.

11. The system of claim 10, wherein:
   the identification module identifies the plurality of cooperating computing devices by determining that each of the plurality of cooperating computing devices is registered on a list of recognized computing devices; and
   the receiving module receives the data about packets intercepted by the plurality of cooperating computing devices that are directed to the wireless network by the unrecognized computing device by determining that the unrecognized computing device is not registered on the list of recognized computing devices.

12. The system of claim 11, wherein the determination module determines that the unrecognized computing device is not registered on the list of recognized computing devices by identifying, by analyzing the packets sent by the unrecognized computing device, a unique identifier of the unrecognized computing device.

13. The system of claim 10, wherein the device location application is not installed on the unrecognized computing device.

14. The system of claim 10, wherein the packets sent by the unrecognized computing device comprise wireless network probe packets sent to seek a wireless access point.

15. The system of claim 10, wherein the determination module further determines that the packets intercepted by the plurality of cooperating computing devices were sent by the same unrecognized computing device by determining, by comparing an identifier within the packets, that the packets comprise the same identifier that uniquely identifies the unrecognized computing device.

16. The system of claim 10, wherein:
   the receiving module receives, from the device location application on a single cooperating computing device within the plurality of cooperating computing devices, additional data about additional packets intercepted by the single cooperating computing device that are directed to the wireless network by an additional unrecognized computing device; and
   the determination module determines a distance of the additional unrecognized computing device from the single cooperating computing device based on information received from the single cooperating computing device that identifies both the physical location for the single cooperating computing device and a signal strength of the additional packets intercepted by the single cooperating computing device.

17. The system of claim 10, wherein the determination module determines the physical location for each cooperating computing device by, for each cooperating computing device, using the device location application to determine the physical location based on distances of the cooperating computing device from each of a plurality of wireless access points for the wireless network.

18. The system of claim 10, wherein the location module performs at least one of:
   alerting a user to a location of the unrecognized computing device;
   storing a location of the unrecognized computing device to a log of computing device locations; and
   storing an event caused by the unrecognized computing device to a log of events.

19. A non-transitory computer-readable medium comprising one or more computer-readable instructions that, when executed by at least one processor of a computing device, cause the computing device to:
   identify a plurality of cooperating computing devices on a wireless network that are each configured with a device location application, wherein none of the cooperating computing devices comprise a wireless access point;

determine, at least in part by the device location application on the plurality of cooperating computing devices, a physical location for each cooperating computing device within the plurality of cooperating computing devices;

receive, from the device location application on the plurality of cooperating computing devices, data about packets intercepted by the plurality of cooperating computing devices that are directed to the wireless network by an unrecognized computing device that is not registered on a list of recognized computing devices;

determine that the packets intercepted by the plurality of cooperating computing devices were sent by the same unrecognized computing device at least in part by determining, by comparing a timestamp of the packets, that the packets comprise the same timestamp;

locate the unrecognized computing device based exclusively on information received from the plurality of cooperating computing devices and without receiving information from any wireless access points or the unrecognized computing device, wherein the information identifies both the physical location for each cooperating computing device and signal strengths of the packets intercepted by the plurality of cooperating computing devices; and perform a security action in response to detecting, by tracking the location of the unrecognized computing device over a period of time, abnormal behavior by the unrecognized computing device, wherein the security action comprises at least alerting an administrator of the wireless network that the unrecognized computing device has performed the abnormal behavior.

20. The method of claim 1, wherein performing the security action further comprises at least one of:
   storing the location of the unrecognized computing device to a log of computing device locations; and
   storing an event caused by the unrecognized computing device to a log of events.

* * * * *